(12) United States Patent
Kean (10) Patent No.: US 12,173,469 B2
(45) Date of Patent: Dec. 24, 2024

(54) APPARATUS AND METHOD FOR GRADE CONTROL

(71) Applicant: Deere & Company, Moline, IL (US)

(72) Inventor: Michael G. Kean, Maquoketa, IA (US)

(73) Assignee: DEERE & COMPANY, Moline, IL (US)

( * ) Notice: Subject to any disclaimer, the term of this patent is extended or adjusted under 35 U.S.C. 154(b) by 612 days.

(21) Appl. No.: 17/301,961

(22) Filed: Apr. 20, 2021

(65) Prior Publication Data

US 2022/0333339 A1    Oct. 20, 2022

(51) Int. Cl.
| | |
|---|---|
| *E02F 3/84* | (2006.01) |
| *E02F 3/76* | (2006.01) |
| *E02F 9/26* | (2006.01) |
| *G06T 7/246* | (2017.01) |

(52) U.S. Cl.
CPC ............ *E02F 3/844* (2013.01); *E02F 3/7613* (2013.01); *E02F 3/7618* (2013.01); *E02F 3/841* (2013.01); *E02F 9/262* (2013.01); *G06T 7/248* (2017.01)

(58) Field of Classification Search
CPC ....... E02F 3/844; E02F 3/7613; E02F 3/7618; E02F 3/841; E02F 9/262; G06T 7/248
See application file for complete search history.

(56) References Cited

U.S. PATENT DOCUMENTS

| | | | |
|---|---|---|---|
| 5,638,133 A | 6/1997 | Squier et al. | |
| 8,412,418 B2* | 4/2013 | Kumagai | G01C 11/06 701/50 |
| 9,447,550 B2* | 9/2016 | Hill | E02F 9/262 |
| 9,970,180 B2 | 5/2018 | Enix | |
| 10,570,588 B1* | 2/2020 | Elkins | G06K 19/0723 |
| 10,697,153 B2 | 6/2020 | Sherlock | |
| 2012/0269387 A1 | 10/2012 | Becker et al. | |
| 2013/0255977 A1* | 10/2013 | Braunstein | E02F 3/765 701/41 |
| 2013/0261902 A1* | 10/2013 | Zhdanov | E02F 3/7618 701/50 |

(Continued)

FOREIGN PATENT DOCUMENTS

| | | |
|---|---|---|
| DE | 102012101927 A1 | 9/2012 |
| DE | 102019211710 A1 | 2/2020 |
| FR | 2762085 A1 | 10/1998 |

OTHER PUBLICATIONS

German Search Report issued in application No. DE102022202478.8 dated Dec. 22, 2022 (08 pages).

*Primary Examiner* — Dale W Hilgendorf (57) ABSTRACT

A work machine including a frame, a ground-engaging element movably coupled to the frame, a movable grading element, an actuator coupled to the movable grading element to controllably drive movement of the movable grading element engaging material to be graded, a sensor, and a controller. The controller comprises a memory that stores computer-executable instruction and a processor that executes the instructions. The instructions include labelling each of at least a plurality of pixels in a first image as a visual marker; selecting the first image as a reference keyframe; tracking at least one region of a subsequent image including the visual marker relative to the reference keyframe to determine an estimate of the current pose as the work machine moves; and adjusting a position of the movable grading element.

25 Claims, 6 Drawing Sheets

(56) References Cited

U.S. PATENT DOCUMENTS

| | | | |
|---|---|---|---|
| 2013/0304331 A1* | 11/2013 | Braunstein | E02F 3/847 |
| | | | 701/50 |
| 2014/0300686 A1 | 10/2014 | Campbell et al. | |
| 2017/0016211 A1* | 1/2017 | Arimatsu | G01S 19/14 |
| 2018/0047193 A1* | 2/2018 | Gao | G06T 7/248 |
| 2018/0165502 A1 | 6/2018 | Mianzo et al. | |
| 2018/0202129 A1* | 7/2018 | Fujii | E02F 9/262 |
| 2018/0210454 A1* | 7/2018 | Ready-Campbell | E02F 3/435 |
| 2019/0352886 A1 | 11/2019 | Harada et al. | |
| 2019/0362157 A1 | 11/2019 | Cambias et al. | |
| 2020/0082262 A1 | 3/2020 | Liu et al. | |
| 2020/0134827 A1* | 4/2020 | Saha | G06F 18/2431 |
| 2020/0232192 A1* | 7/2020 | Sherlock | E02F 3/844 |
| 2020/0293059 A1* | 9/2020 | Wang | E02F 9/262 |
| 2021/0061307 A1 | 3/2021 | Connell et al. | |

* cited by examiner

APPARATUS AND METHOD FOR GRADE CONTROL

CROSS-REFERENCE TO RELATED APPLICATIONS

Field of the Disclosure

The present disclosure relates to a work machine, such as a loader, and method for grading a surface. In particular, the work machine grade control system for controlling an implement position based on a sensor to achieve a desired grade of the surface.

BACKGROUND

There are many different types of work machines. Some such work machines include agricultural machines, construction machines, forestry machines, turf management machines, among others. Several work machines, including loaders, motor graders, and skid steers, to name a few, can be used in construction and maintenance for creating a flat surface at various angles, slopes, and elevations. To properly grade a surface, the orientation of the movable grading element (e.g. a blade) is controlled to achieve the desired grade. Grading, for example with a front-end loader, requires slow and steady patience. When moving dirt, sand, or gravel, each pass over the work surface (about a half blade wide) must match the existing grade of a prior pass. In some instances, an operator may try a diagonal pass if the grade is still not level after a few tries while tilting the movable grading element to make any corrections. Work machine control systems, which include two-dimensional (2D) and three-dimensional (3D) machine control systems are located near the surface being graded to provide grade information. A work machine grade control system receives signals from the machine control system to enable grading the surface to a desired grade. The grade control system may be configured to automatically control the slope, angle, and elevation of the blade to grade the surface based on desired slopes, angles, and elevations as is known by those skilled in the art. In these automatic systems, adjustments to the position of the blade with respect to the work machine are made constantly in order to achieve the slope, angle, and elevation targets. However, a common issue with these grade control systems is that there is no external vertical reference to gauge the height of the cut from pass to pass. Although adding costly equipment such as laser planes, and ultrasonic sensors may assist in correlating an external vertical reference, therein lies a need for a more simplistic approach without the addition of equipment, the addition of site setup, or a connection to the grid such as global positioning systems.

SUMMARY

The present disclosure relates to an apparatus and method for grade control with a work machine. The work machine comprises a frame, a ground-engaging mechanism, a movable grading element, an actuator, a sensor, and a controller. The ground-engaging mechanism may be movably coupled to the frame and driven by a power source to drive movement of the work machine. The movable grading element may be movably supported by the frame to move relative to the frame. The actuator may be coupled to the movable grading element to controllably drive movement of the movable grading element to engage material to be graded. A sensor may be coupled to the work machine that captures a plurality of images in a field of view. The controller may comprise a memory that stores computer-executable instructions and a processor that executes the instructions to label each of at least a plurality of pixels in a first image as a visual marker, select the first image as a reference keyframe; track at least one region of a subsequent image including the visual marker relative to the reference keyframe to determine an estimate of a current pose as the work machine moves; and adjust a position of the movable grading element with the actuator to achieve a desired grade based on the tracking of the visual marker. The tracking of the visual marker in the vertical direction may be indicative of a cutting depth of the material.

The processor may label a new first image at the beginning of each pass and select the new first image as the reference keyframe. The new first image may include a visual marker from the first image.

Adjusting the position of the movable grading element includes one or more of a pitch, a yaw, and a roll of the movable grading element.

The processor may further log tracking data and fuse the tracking data from the first image and the subsequent image to map three-dimensional movement of the visual marker. Mapping of the visual markers include stitching together reference keyframes. The visual marker may comprise of a constellation of visual markers which are used to stitch together keyframes and map the field of view. An inertial measurement unit may be coupled to the work machine wherein the inertial measurement unit provides a gravitation reference.

The method of controlling the work machine includes capturing a plurality of images with a sensor coupled to the work machine in a field of view of the work machine; labeling each at least of a plurality of pixels as a visual marker in a first image from the plurality of images; selecting the first image as a reference keyframe; tracking at least one region of a subsequent image including the visual marker from the plurality of images relative to the reference keyframe to determining an estimate of a current pose as the work machine moves; determining movement of the movable grading element required; and adjusting the position of the movable grading element with an actuator to achieve a desired grade based on the tracking of the visual marker. Tracking of the visual mark in a vertical direction is indicative of a cutting depth of a material. The processor labels a new first image at the beginning of each pass and selects the new first image as the reference keyframe. The new first image includes the visual marker from the first image. Adjusting the position of the movable grading element includes one or more of a pitch, a yaw, and a roll of the movable grading element.

The method may further comprise logging tracking data, fusing the tracking data from the first image and subsequent image; and mapping three-dimensional movement of the visual marker. Mapping of the visual markers may be used to stitch together keyframe, and thereby map the grade of each pass. The method may further comprise selecting a new first image as the reference keyframe at the beginning of each pass; determining the visual markers in the new first image; identify a common visual marker from the first new image and the first image wherein the common visual marker is labeled as an external reference; comparing the external reference from the new first image to the first image; and adjusting the position of the movable grading element.

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "controller" is a computing device including a processor and a memory. The "controller" may be a single device or alternatively multiple devices. The controller may further refer to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The term "processor" is described and shown as a single processor. However, two or more processors can be used according to particular needs, desires, or particular implementations of the controller and the described functionality. The processor may be a component of the controller, a portion of the object detector, or alternatively a part of another device. Generally, the processor can execute instructions and can manipulate data to perform the operations of the controller, including operations using algorithms, methods, functions, processes, flows, and procedures as described in the present disclosure.

Figure 1:
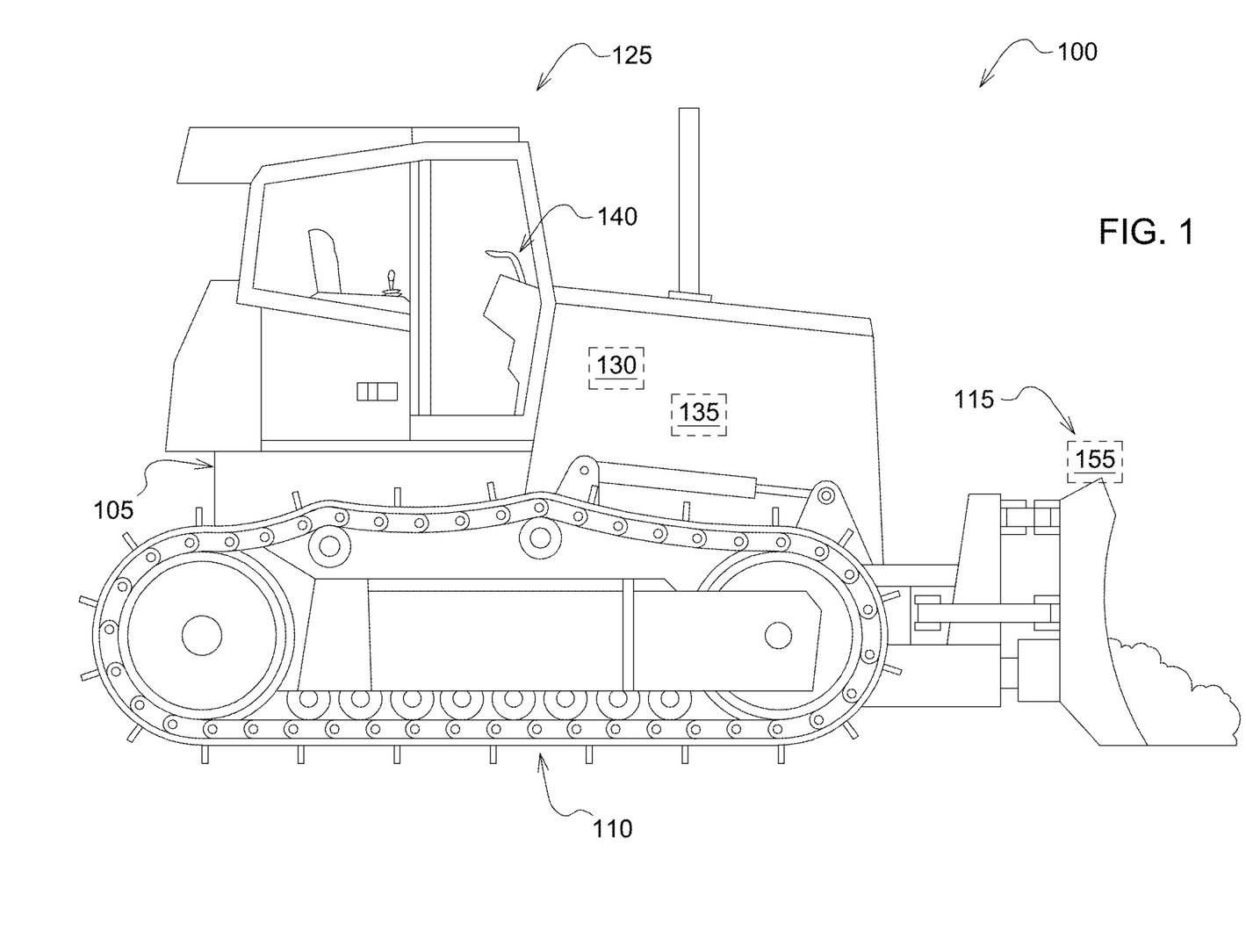
FIG. 1 is a side view of a work machine at a worksite.

FIG. 1 is a side view of an exemplary embodiment of a work machine 100 in a worksite 150 environment. The work machine 100 is embodied as a loader including a frame 105, a ground-engaging element 110 movably coupled to the frame 105, a movable grading element 115 (shown here as a blade) movably supported by the frame 105 to move relative to the frame 105, an actuator 120, a sensor 126, and a controller 130. The ground-engaging element 110 is driven by a power source 135 to drive movement of the work machine 100. The actuator 120 is coupled to the movable grading element 115 and controllably drives movement of the movable grading element 115 to engage material to be graded. The work machine 100 is often operated by an operator. However, in some instances, the work machine 100 may operate at different levels of autonomy. The operator utilizes a user interface 140 to operate the work machine 100. The user interface 140 may comprise physical mechanisms (e.g. levers, pedals, etc.), displays, touchscreens, software interfaces, etc. to allow the operator to control various controllable subsystems 145 (shown in FIG. 2) on the work machine 100. Some examples of subsystems 145 on a work machine are blade, steering/propulsion system, ripper, etc. To aid in operation of the work machine 100 there may be different types of sensors to monitor various aspects of operation. Some examples of sensors include visual sensors, hydraulic strain gauges, pressure gauges, linear displacement transducers, hall effect sensors, potentiometers, odometers, fuel gages, GPS receivers, compasses, gyroscopes, accelerometers, etc.

Figure 2:
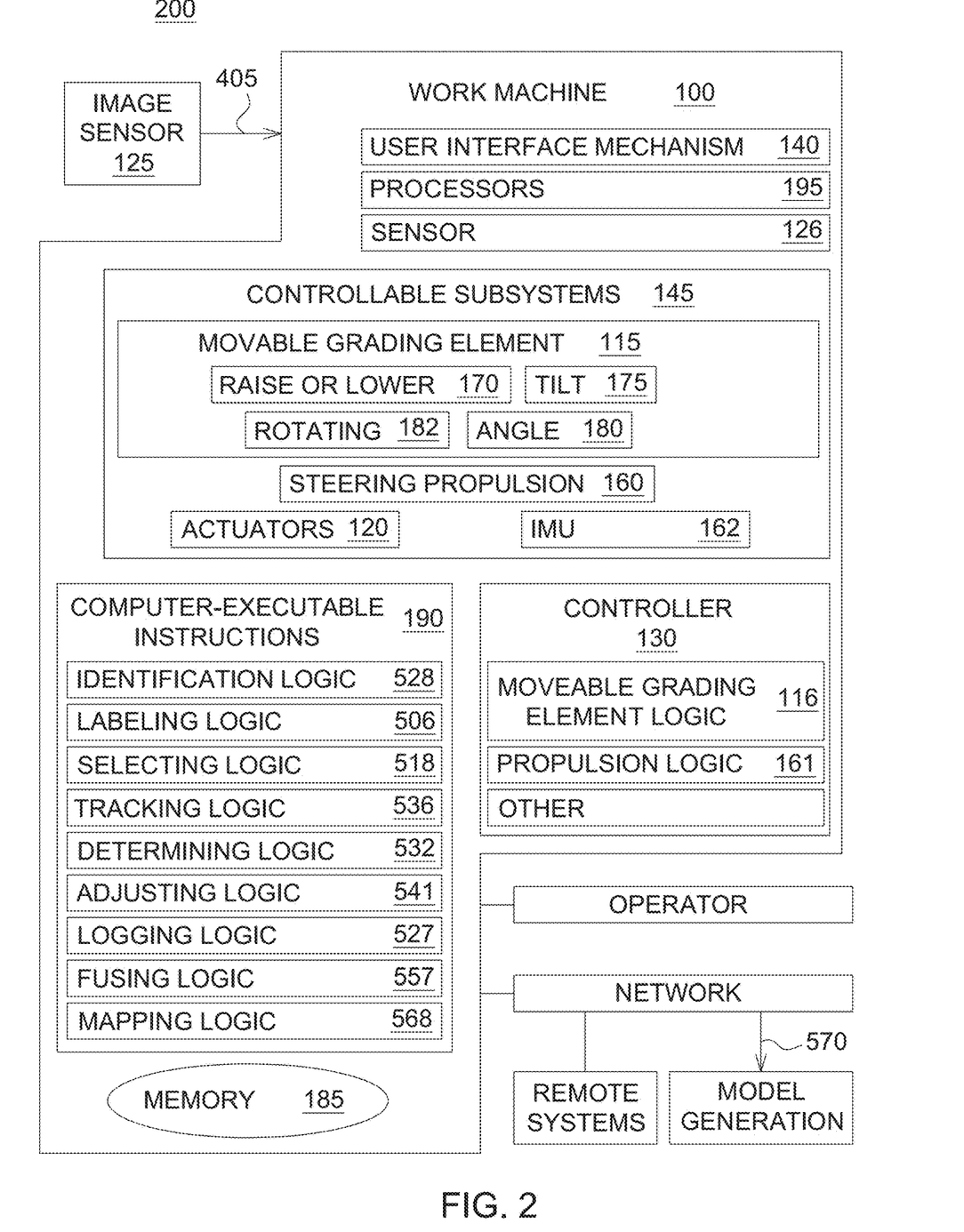
FIG. 2 illustrates a block diagram of an exemplary control system consistent with certain disclosed embodiments.

FIG. 2 is a block diagram of one example of a grade control system 200 of a work machine 100. The system 200 comprises sensors, processors, machine control systems, user interface mechanism(s), controllable subsystems, datastore, and other elements as well. Controllable subsystems 145 include the movable grading element 115, steering/propulsion 160, and other possible systems indicated by the blocks. The actuators that control the functions of controllable subsystems 145 may be controlled by signals from the control system 200. For example, movable grading element logic 116 generates control signals for the actuators 120 that move the grading element 115. Some examples of the movable grading element logic 116 include signals that control the actuator to raise or lower the blade 170, tilt the blade 175 or angle the blade 180, etc. Some work machines may further include rotating blade 182. Propulsion logic 161 generates control signals to control actuators corresponding to steering/propulsions systems 160. Some examples of control signals generated by propulsion logic 161 include signals that control actuators 120 for steering propulsion 160 to move the work machine 100 forward or backward, turn or rotate the machine, etc. The work machine 100 can include several different sensors, including blade height sensor, surface sensors, image sensors, and others. The system 200 outlines use of inputs from a vision system (which includes the image sensor 125) coupled to the work machine 100 for tracking a change in grade 158 and controlling the orientation of the movable grading element 115.

Figure 3:
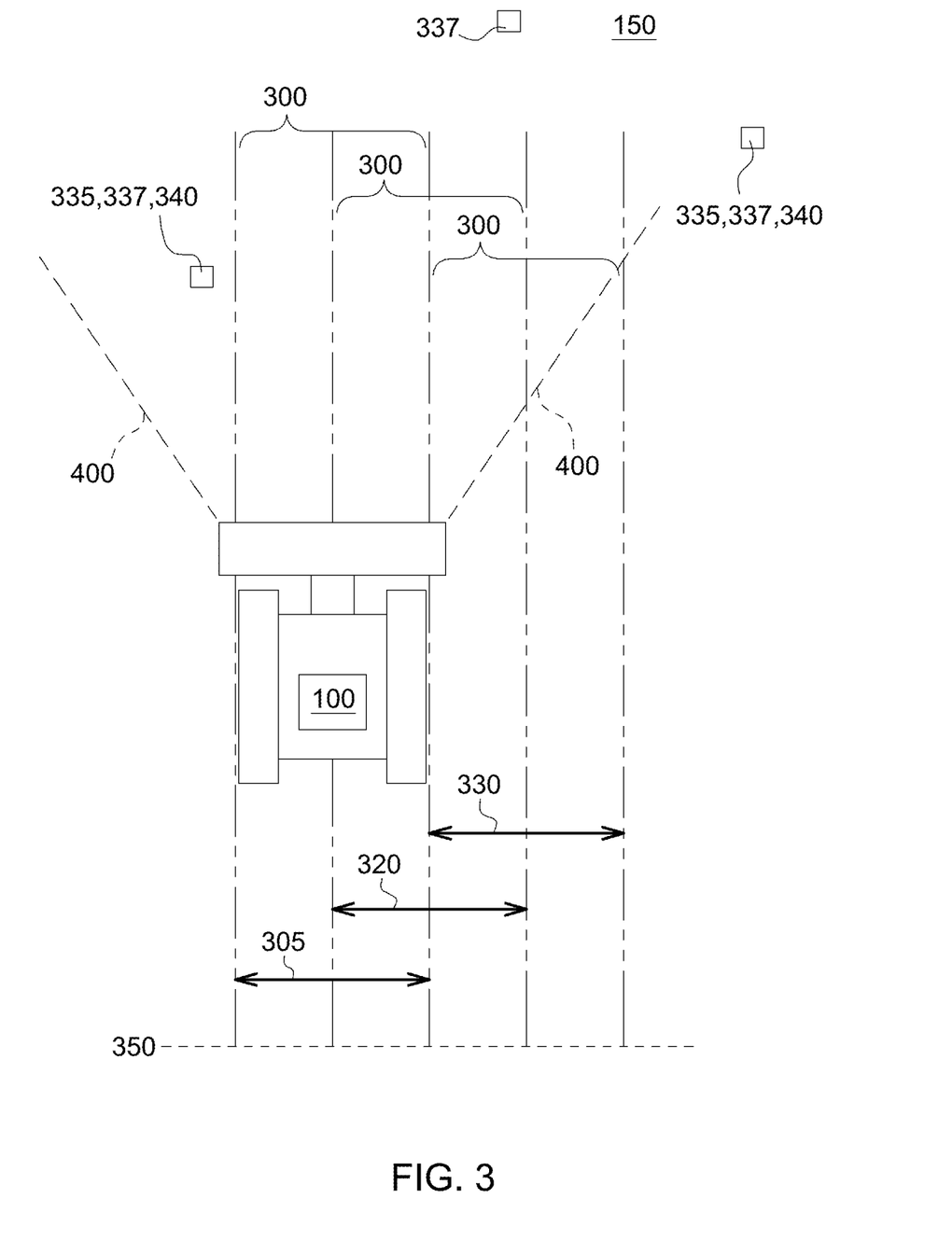
FIG. 3 is an exemplary top view schematic of a work machine at a worksite.

FIG. 3 is a top view schematic of an exemplary worksite 150 demonstrating a series of cutting passes 300 a work machine 100 may perform during a grading operation. In the exemplary worksite 150 shown, the grading operation is leveling an area. As shown, a first cutting pass 305 may begin at a first position 350. A second cutting pass 320 may run parallel to and/or overlap (in this example, a half blade's length) the first cutting pass 305 to ensure both passes are level with respect to one another. A third cutting pass 330 may run parallel to and/or overlap the second cutting pass 320 to ensure both passes are level with one another. One or more stationary objects 337 or features are identified to be labeled as visual markers 335, and thereby serving as an external reference point 340 as described below. The processor 195 may identify objects 337 most suitable for visual odometry using identification logic 528. The identification logic 528 may include, for example, whether the object is stationary, sufficiently contrasting with the background, and appropriately sized and located to be a visual marker 335.

Figure 4A:
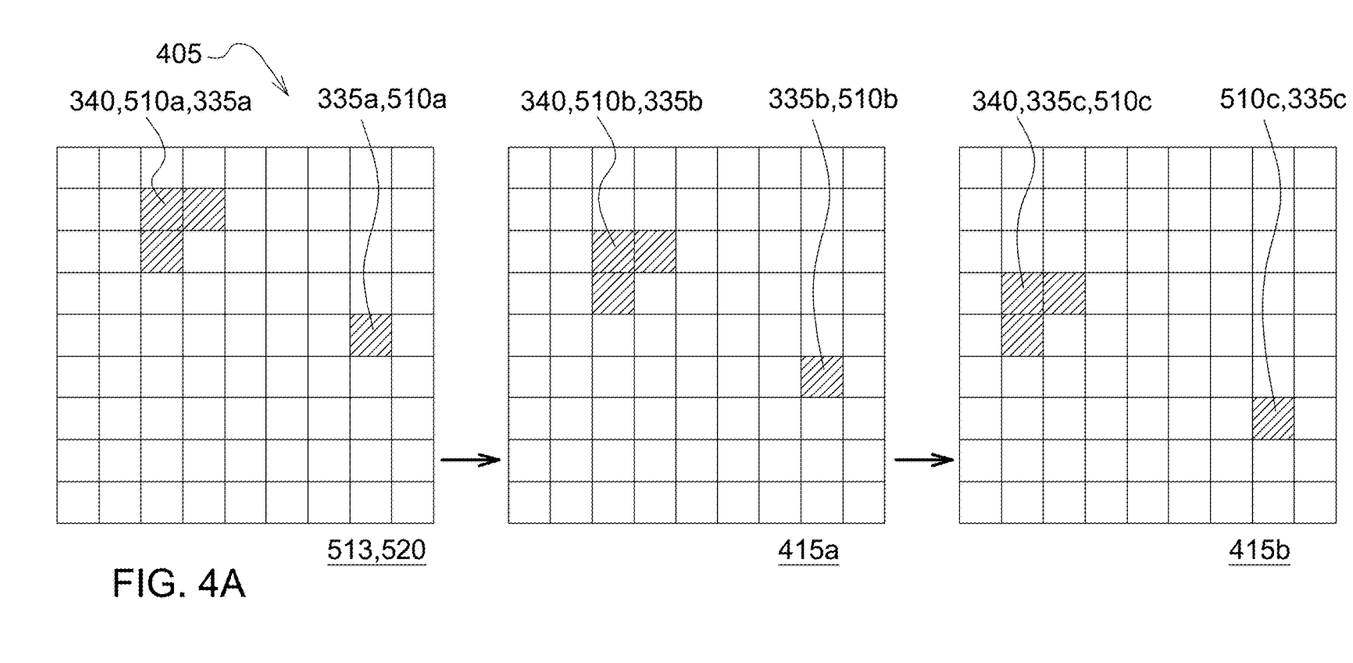
FIG. 4A is an exemplary keyframe comparison, and image-to-image comparison.
Figure 4B:
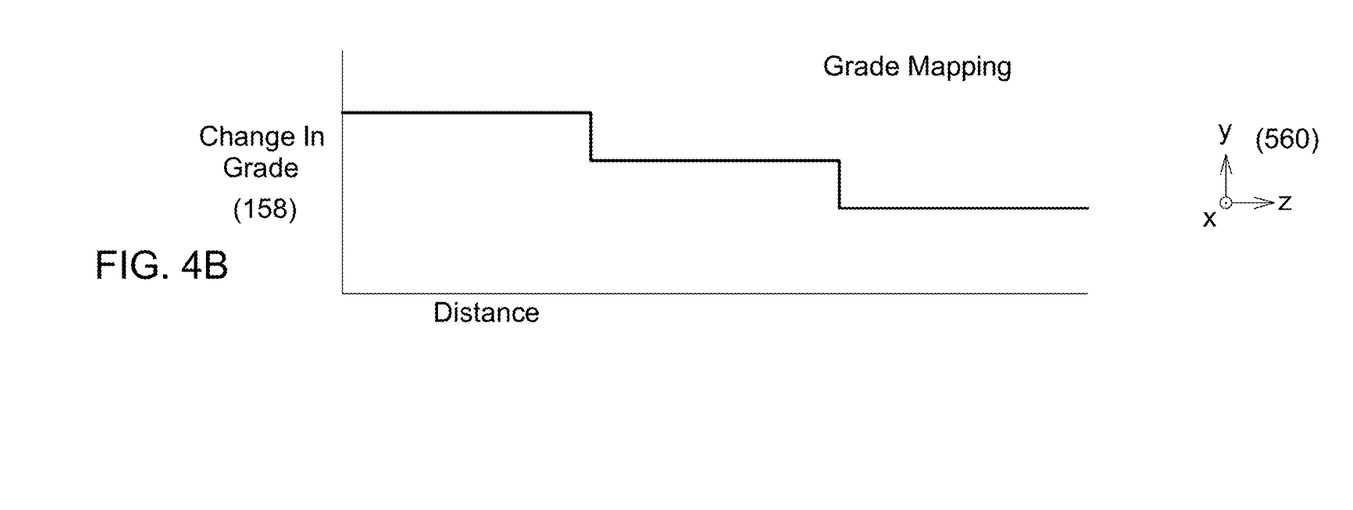
FIG. 4B is the change in grade corresponding to the keyframes in FIG. 4A.
Figure 5:
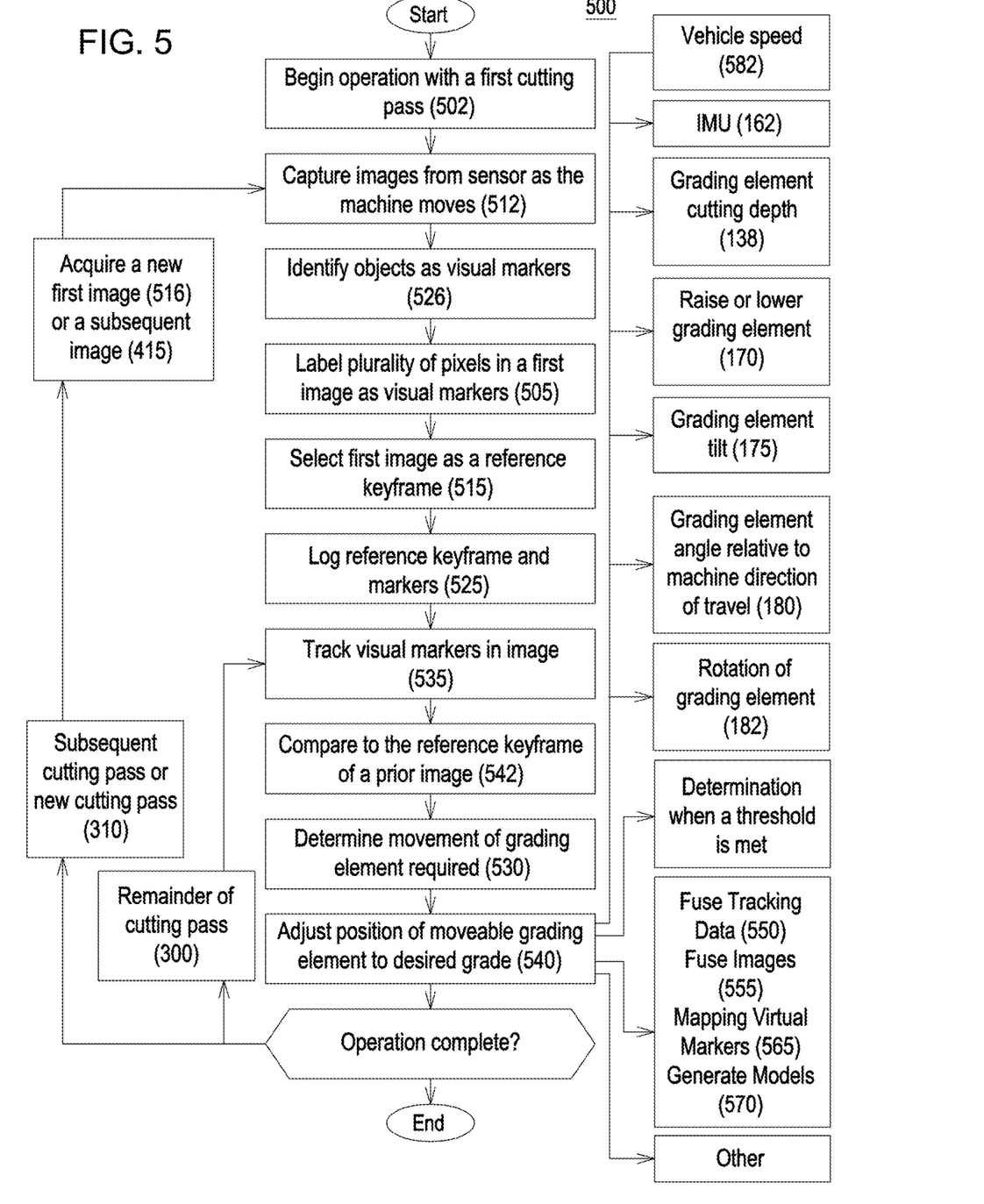
FIG. 5 is a flow diagram showing an exemplary operation of the work machine.

Now referring to FIGS. 2-5, and more particularly FIGS. 4-5, an image sensor 125 (i.e. image acquiring sensor, vision system, camera, etc.) is coupled to the work machine 100 and captures a plurality of images 405 in a field of view 400. In one example, the field of view 400 may be forward facing as shown in FIG. 3. This image sensor 125 may be pre-existing (e.g. part of a backup camera, object avoidance system, blind spot assist, etc.) and provide sensing in addition to providing context to the operator. Alternatively, the image sensor 125 may be a supplemental vision system coupled to the work machine 100. The controller 130 is coupled to the image sensor 125 and a memory 185 stores computer-executable instructions 190 and a processor 195 executes the instructions 190 whenever the work machine 100 begins a cutting pass 300. Upon capturing 512 images from the image sensor as the work machine 100 moves, the instructions 190 include labeling 505 each of at least a plurality of pixels 510 in a first image 513 as a visual marker 335 using labeling logic 506, selecting 515 the first image 513 as a reference keyframe 520 using selection logic 518, and logs 525 the reference keyframe 520 as well as the visual marker locations using logging logic 527. The processor 195 may discern which visual markers 335 may be suitable for visual odometry when labeling. For the remainder of the cutting pass 300 the processor 195 tracks 535 at least one region of subsequent images 415 with the visual marker 335 using tracking logic 536 and compares 542 it to the reference keyframe 520 or a prior subsequent image 415 to determine 530 an estimate of the current pose as the work machine 100 moves using determining logic 532. The processor 195 then adjusts 540 a position of the movable grading element 115 with an actuator 120 to achieve a desired grade based on the tracking 535 of the visual marker 335 as the work machine 100 moves using adjustment logic 541.

Upon starting a new cutting pass 300 or a subsequent cutting pass 310, the processor 195 repeats the procedure of acquiring 512 a new first image 516, which includes one or more visual markers 335 from the first image 513, labels 505 a plurality of pixels 510 in the new first image 516 at the beginning of each pass 350 as a visual marker 335, and selects 515 the new first image 516 as the reference keyframe 520. As shown in FIG. 4, the processor 195 may compare the reference keyframes 520 similar to how a stereo vision system scans images to detect disparity. However, instead of calculating disparity, the processor 195 may map 565 one reference keyframe 520 to another and thereby creating a single consistent external reference 340 that applies to both reference keyframes (i.e. the reference keyframe 520 from the first cutting pass 305 and the reference keyframe 520 from a subsequent image 415 on the first cutting pass 305). The processor 195 may then adjust the position of a movable grading element 115 to include one or more of raising or lowering 170, tilting 175 or angling 180 the blade (also known as a pitch, a yaw, and a roll) or rotating the movable grading element 115. The use of a common reference 340 can be continued so long as each reference keyframe 520 can be mapped to the previous or a prior reference keyframe 520. A current reference keyframe 520 is not required to have any visual markers 335 or overlap entirely with the field of view 400 from the first reference keyframe 520. The visual marker 335 may comprise a constellation of visual markers 355 to maintain a consistent external reference 340.

The processor 195 may further log 525 the data 550 acquired from tracking the visual marker 335 (hereinafter referred to as tracking data 550) and may fuse 555 the tracking data 550 using fusing logic 557 from the first image 513 and the subsequent image 415 to map either a two-dimensional or a three-dimensional movement of the visual marker 335 over a distance, thereby generating a model 570 of the worksite 150.

Tracking of the visual marker 335 in a vertical direction 560 is indicative of a cutting depth 138 of the material which may correlate to a change in grade 158 as shown in FIG. 4.

Mapping of the visual markers 335 includes stitching together the reference keyframes 520 using mapping logic 568.

Figure 6:
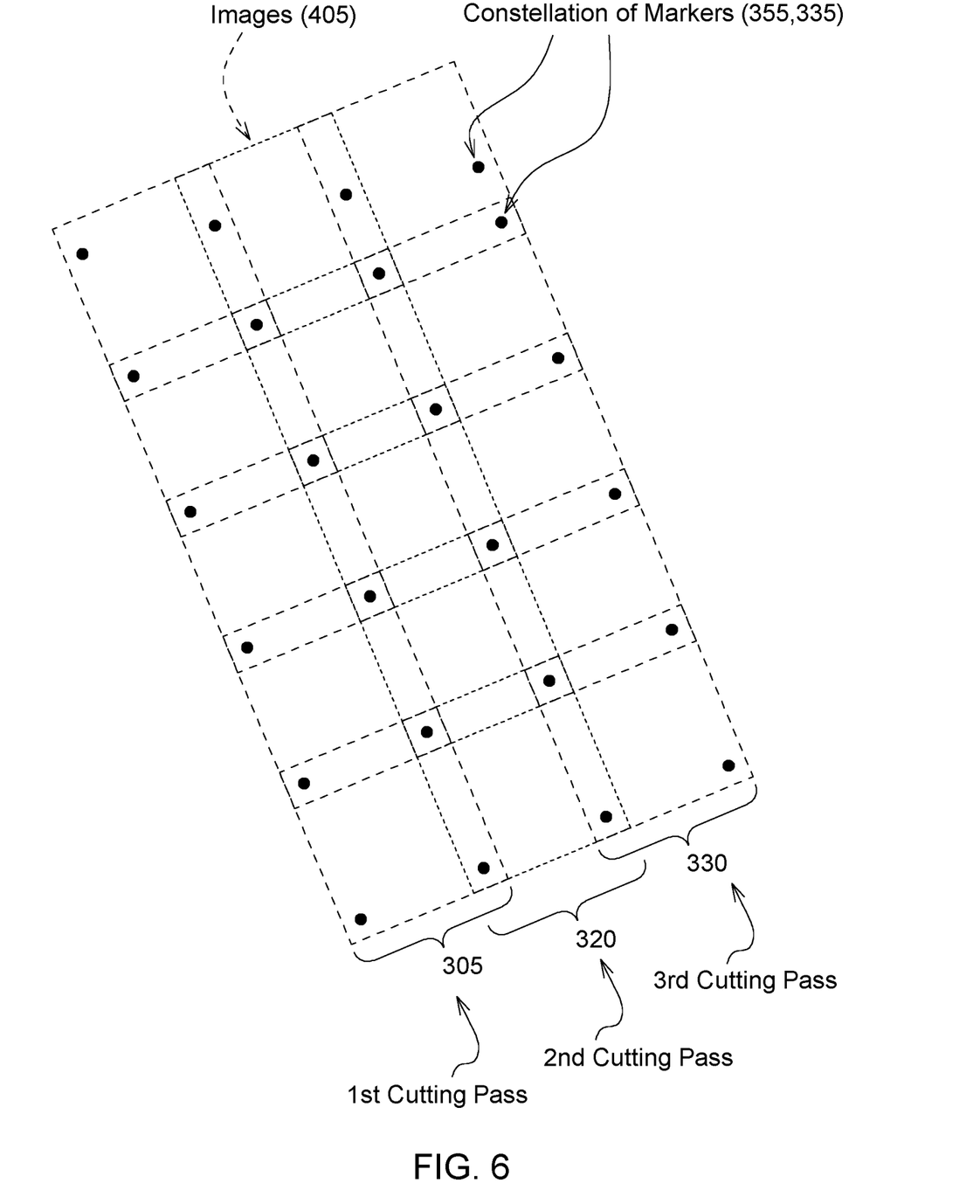
FIG. 6 is an exemplary view of a three-dimensional map generated by the grade control system.

The constellation 355 of visual markers 335 is used to align together reference keyframes 520 and images 405 (as shown in FIG. 6) for the stitching process, and thereby maps 565 the grade in a worksite 150.

An inertial measurement unit 162 may be coupled to the work machine and provide a gravitation reference. Fusing 555 the tracking data 550 with output from an inertial measurement unit 162 may strengthen the ability to track motion with respect to the external reference frame (consisting about external reference points 340). Keyframes 520 may be logged in a multitude of orientations and the current position and heading of the work machine 100 may be used to stitch the various reference keyframes 520 and images 405 to correlate the visual markers 335, and therefore map 565 grading and grading productivity on a worksite 150. This advantageously provides a full three-dimensional modeling (shown in FIG. 6) or a two-dimensional modeling on a worksite 150 in the absence of GPS, a surveyor, and a laser plane.

Now turning to FIG. 5, a method 500 of controlling a work machine 100 include the following. In a first step 502, we begin operation with a first cutting pass 305. In step 512, the method 500 includes capturing a plurality of images 405 with an image sensor 125 coupled to the work machine 100 in a field of view 400 of the work machine 100. In a next step 526, a processor 195 on a controller 130 of the work machine 100 labels each at least of a plurality of pixels 510 as a visual marker 335 in a first image 513 from the plurality of images 405. Subsequently in step 515, the processor 195 selects the first image 513 as a reference keyframe 520. In a next step 535, the processor 195 tracks at least one region of a subsequent image 415 that includes the visual marker(s) 335 from the plurality of images 405 relative to the reference keyframe 520. Tracking only a region, as opposed to an entire image or field of view, enables data compression and/or a reduction of memory 185 for mapping visual markers 565 and generating models 570. For Step 526, step 505, and step 535 may alternative by referred to as the processor 195 determining an estimate of the current pose as the work machine 100 moves and sense with a movable element sensor 155, a current position of the movable grading element 115. In step 530, the processor 195 determines movement of one or more of ground-engaging element 110 and the movable grading element 115 involved. In step 540, the processor 195 then adjusts a position of the movable grading element 115 with an actuator 120 to achieve the desired grade based on the tracking of the visual marker(s) 335.

The method may further include generating a model 570 by logging the tracking data in step 525, derived from tracking 535 a region of an image, fusing 555 the tracking data 550 from the first image 513 and a subsequent image 415, and mapping three-dimensional movement of the visual marker 335 as the work machine 100 moves. Vehicle speed 582 may also be used to generate a model 570 of grading performed.

What is claimed is:

1. A work machine comprising:
   a frame;
   a ground-engaging element movably coupled to the frame and driven by a power source to drive movement of the work machine;
   a movable grading element movably supported by the frame to move relative to the frame;
   an actuator coupled to the movable grading element to controllably drive movement of the movable grading element to engage material to be graded;
   a sensor coupled to the work machine that captures a plurality of images in a field of view; and
   a controller coupled to the sensor, the controller comprising a memory that stores computer-executable instructions and a processor that executes the instructions, to:
      label each of at least a plurality of pixels in a first image as a visual marker;
      select the first image as a reference keyframe;
      track at least one region of a subsequent image including the visual marker relative to the reference keyframe to determine an estimate of a current pose as the work machine moves; and
      adjust a position of the movable grading element with the actuator to achieve a desired grade based on the tracking of the visual marker
      wherein the processor labels a new first image at the beginning of each pass and selects the new first image as the reference keyframe.

2. The work machine of claim 1, wherein the tracking of the visual marker in a vertical direction is indicative of a cutting depth of the material.

3. The work machine of claim 1, wherein the new first image includes the visual marker from the first image.

4. The work machine of claim 1, wherein adjusting the position of the movable grading element includes one or more of a pitch, a yaw, and a roll of the movable grading element.

5. The work machine of claim 1, wherein the processor further logs a tracking data and fuses the tracking data from the first image and the subsequent image to map three-dimensional movement of the visual marker.

6. The work machine of claim 5, wherein the mapping of the visual markers include stitching together reference keyframes.

7. The work machine of claim 1, wherein the visual marker comprises a constellation of visual markers.

8. The work machine of claim 7, wherein the constellation of visual markers is used to stitch together keyframes, and thereby mapping the field of view.

9. The work machine of claim 1, further comprising:
   an inertial measurement unit coupled to the work machine wherein the inertial measurement unit provides a gravitation reference.

10. A method of controlling a work machine, the method comprising:
    capturing a plurality of images with a sensor coupled to the work machine in a field of view of the work machine;
    labeling each at least of a plurality of pixels as a visual marker in a first image from the plurality of images;
    selecting the first image as a reference keyframe;
    tracking at least one region of a subsequent image including the visual marker from the plurality of images relative to the reference keyframe to determining an estimate of a current pose as the work machine moves;
    determining a movement of a movable grading element required; and
    adjusting a position of the movable grading element with an actuator to achieve a desired grade based on the tracking of the visual marker
    wherein a processor labels a new first image at the beginning of each pass and selects the new first image as the reference keyframe.

11. The method of claim 10 wherein the tracking of the visual mark in a vertical direction is indicative of a cutting depth of a material.

12. The method of claim 10, wherein the new first image includes the visual marker from the first image.

13. The method of claim 10, wherein adjusting the position of the movable grading element includes one or more of a pitch, a yaw, and a roll of the movable grading element.

14. The method of claim 10, wherein the method further comprises:
    logging a tracking data;
    fusing the tracking data from the first image and the subsequent image; and
    mapping three-dimensional movement of the visual marker.

15. The method of claim 14, wherein the mapping of the visual markers is used to stitch together keyframes, and thereby map the grade of each pass.

16. The method of claim 10, wherein the visual marker comprises a constellation of visual markers.

17. A method of controlling a work machine, the method comprising:
    capturing a plurality of images with a sensor coupled to the work machine in a field of view of the work machine;
    labeling each at least of a plurality of pixels as a visual marker in a first image from the plurality of images;
    selecting the first image as a reference keyframe;
    tracking at least one region of a subsequent image including the visual marker from the plurality of images relative to the reference keyframe to determining an estimate of a current pose as the work machine moves;
    determining a movement of a movable grading element required; and
    adjusting a position of the movable grading element with an actuator to achieve a desired grade based on the tracking of the visual marker;
    selecting a new first image as the reference keyframe at the beginning of each pass,
    determining the visual markers in the new first image;
    identifying a common visual marker from the new first image and the first image wherein the common visual marker is labeled as an external reference;
    comparing the external reference from the new first image to the first image; and
    adjusting the position of movable grading element.

18. The method of 17, wherein a constellation of visual markers is used to stitch together keyframes, and thereby map the field of view.

19. The method of claim 17, wherein the tracking of the visual mark in a vertical direction is indicative of a cutting depth of a material.

20. The method of claim 17, wherein a processor labels the new first image at the beginning of each pass and selects the new first image as the reference keyframe.

21. The method of claim 20, wherein the new first image includes the visual marker from the first image.

22. The method of claim 17, wherein adjusting the position of the movable grading element includes one or more of a pitch, a yaw, and a roll of the movable grading element.

23. The method of claim 17, wherein the method further comprises:
   logging a tracking data;
   fusing the tracking data from the first image and the subsequent image; and
   mapping three-dimensional movement of the visual marker.

24. The method of claim 17, wherein the mapping of the visual markers is used to stitch together keyframes, and thereby map the grade of each pass.

25. The method of claim 17, wherein the visual marker comprises a constellation of visual markers.

\* \* \* \* \*